June 4, 1929.  W. H. HIMES  1,715,706
MOUNTING FOR CIRCUIT BREAKERS
Filed Feb. 5, 1927  2 Sheets-Sheet 1

WITNESSES:
E. A. McCloskey
Harrison Bates

INVENTOR
Walter H. Himes
BY
Wesley G. Carr
ATTORNEY

June 4, 1929.  W. H. HIMES  1,715,706
MOUNTING FOR CIRCUIT BREAKERS
Filed Feb. 5, 1927   2 Sheets-Sheet 2
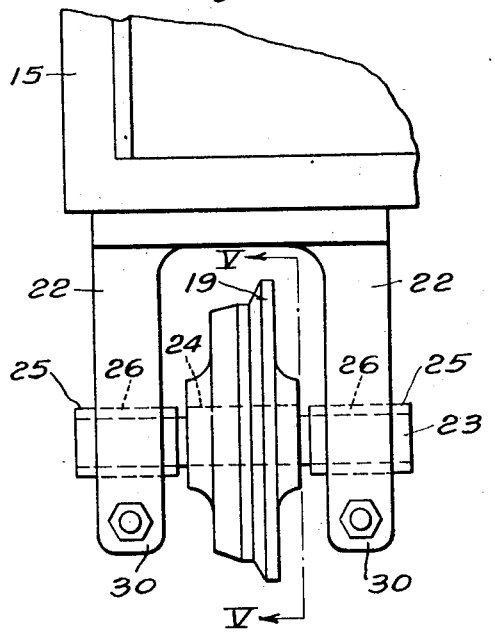
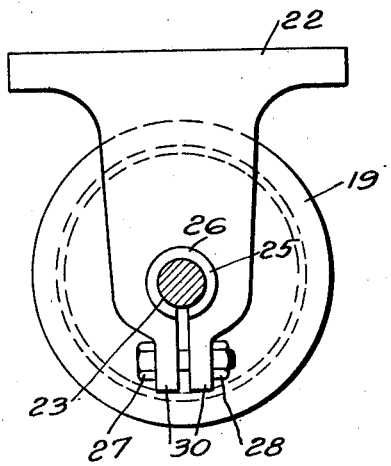
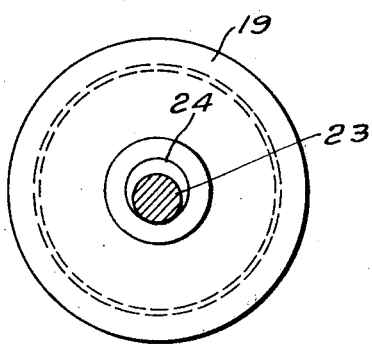
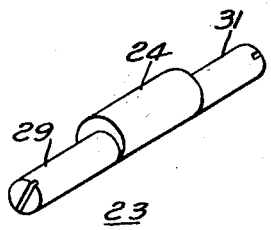
WITNESSES:
INVENTOR
Walter H. Himes.
BY
ATTORNEY Patented June 4, 1929.

1,715,706

UNITED STATES PATENT OFFICE.

WALTER H. HIMES, OF WILKINSBURG, PENNSYLVANIA, ASSIGNOR TO WESTINGHOUSE ELECTRIC & MANUFACTURING COMPANY, A CORPORATION OF PENNSYLVANIA.

MOUNTING FOR CIRCUIT BREAKERS.

Application filed February 5, 1927. Serial No. 166,127.

My invention relates to switch mechanisms and particularly to switch mechanisms of the cell type.

One object of my invention is to provide a switch mechanism comprising a fixed cell, a movable cell having supporting wheels and means for connecting the said wheels to the movable cell that shall predetermine its elevation.

Another object of my invention is to provide a switch mechanism comprising a circuit interrupter disposed within a frame and supporting wheels mounted on the frame by means that shall predetermine the elevation of the circuit interrupter.

Another object of my invention is to provide a switch mechanism comprising a fixed cell structure having contact members and a track therein, and a movable cell having a circuit interrupter, contact members for engaging the contact members in the stationary cell and supporting wheels that shall be movable with respect thereto for adjusting the elevation of the movable cell and for causing the contact members mounted thereon to be alined with the contact members mounted in the stationary cell.

It is a further object of my invention to provide a switch mechanism comprising a fixed cell having contact members and a track, a movable cell having a circuit interrupter and contact members for engaging the contact members in the stationary cell and supporting wheels that shall be movable with respect thereto for adjusting the position of the truck in lateral, longitudinal and vertical directions.

I have found, in practice, that with a switch mechanism of the cell type comprising a stationary structure having contact members, bus bars and other live conducting parts disposed therein, and a movable structure comprising circuit interrupters, contact members and other well known switchboard apparatus adapted to engage and to co-operate with the contact members in the stationary cell, it is very difficult to secure proper alinement of the corresponding contact members and, such alinement, involves much expense in machining the wheels and brackets supporting the movable structure. It is well known that a very slight error in machining and fitting the wheels and brackets to the movable truck is greatly multiplied at the top of the structure, thereby rendering it necessary to rebuild the structure.

Accordingly, I have devised means for adjusting the relative position of the movable cell structure with respect to the stationary cell structure, so that maximum freedom is permitted in the manufacture of the wheels and brackets, thereby rendering this type of apparatus more simple in construction and less expensive to manufacture.

In order that the invention may be clearly understood, it will now be described with reference to the accompanying drawings as applied, by way of example, to switch gear of the cell type wherein, Figure 1 is a front view, in elevation, of a switch mechanism embodying my invention.

Fig. 3 is an enlarged front view of a wheel and connecting means embodying my invention.

Fig. 4 is an enlarged side view of a wheel and connecting means embodying my invention.

Fig. 5 is a sectional view taken along the line V—V of Fig. 3, and

Fig. 6 is an enlarged detail view showing the shaft embodying my invention.

Figure 1:
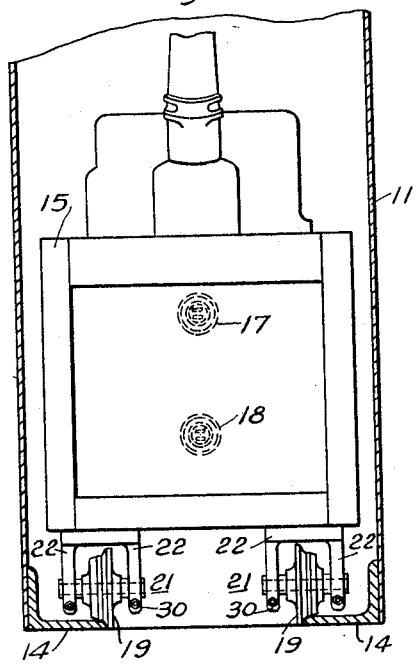
Figure 2:
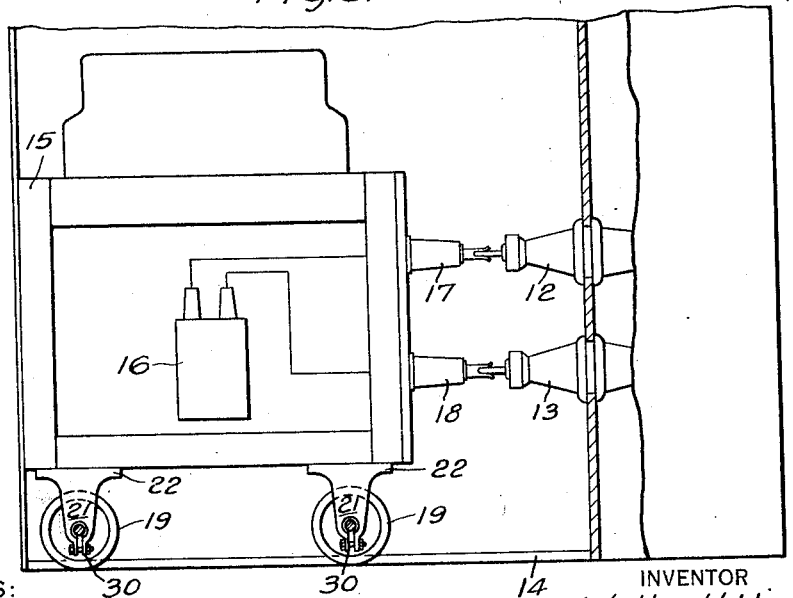
Fig. 2 is a side view, in elevation, of a switch mechanism embodying my invention.

In practicing my invention, I provide a stationary cell structure 11 having contact members 12 and 13 disposed therein, and a track 14, and a movable cell structure 15 having a circuit interrupter 16, contact members 17 and 18 for engaging and co-operating with the corresponding contact members 12 and 13 in the stationary cell 11, and supporting wheels 19 having adjustable connections 21 for connecting them to the movable cell and for predetermining its elevation.

Referring to Figs. 3, 4, 5 and 6, each connection 21 comprises a bifurcated bracket 22, a shaft 23 having an eccentric portion 24, and split bushings 25. The bracket 22 is fastened to the bottom of the movable cell structure 15 by any suitable means. The bracket 22 is provided, at its lower ends, with cylindrical openings 26 that are adapted to receive the bushings 25 and with slots for permitting adjustment of the shaft 23 by operating clamps 30. The clamps 30 consist of clamping bolts 27 and nuts 28.

The wheels 19 are disposed on the eccentric portions 24, of the shafts 23 and are adapted to turn freely on the shaft. The wheels 19 support the movable structure 15 by engaging and travelling along the track 14 that constitutes a portion of the bottom of the stationary cell 11, when the movable cell structure 15 is being moved into and out of engagement with the stationary structure 11.

The shaft 23 consists of an eccentric or main body portion 24 and two concentric end portions 29 and 31. The eccentric portion 24 is adapted to receive the wheel 19 and is of substantially the same diameter as the inner diameter of the wheel hub. The end portions 29 and 31 of the shaft 23 are adapted to receive the slotted bushings 25, the bushings being adapted to extend into the cylindrical openings 26 of each of the sides of the brackets 22 and are held in a predetermined position, together with the shaft 23, by the clamps 30.

When it is desired to adjust the position of the movable cell 15, in order to aline the contact members 17 and 18 disposed thereon, with the contact members 12 and 13 disposed in the stationary cell structure 11, I loosen the nut 28 of the clamping means 30, thereby rendering the shaft 23 movable in the bushings 25 and wheel 19. As the wheel 19 is disposed on the eccentric portion 24 of the shaft 23, it is necessary only to turn the shaft 23 to a position that will render a higher or lower elevation of the shaft 23, as desired.

The shafts 23 may thus be adjusted in both a longitudinal and a vertical direction with respect to the cell structure, by turning the eccentric portion 24 to the desired position. The wheels are adapted to be adjusted in a lateral direction by sliding the shafts 23 and bushings 25 to the right or to the left, as may be desired.

Accordingly, I have provided a switch mechanism comprising a fixed cell structure having contact members and a track therein, and a movable cell structure having contact members therein for engaging the corresponding contact members in the stationary cell structure, wheels for supporting it and means for adjusting its position for alining the contact members disposed therein with the contact members disposed in the stationary cell.

While I have described and illustrated but one embodiment of my invention, it will be apparent to those skilled in the art, that certain changes, modifications, additions and omissions may be made in the structure above described without departing from the spirit and scope of the appended claims.

I claim as my invention:

1. In a structure of the character described, means for adjustably supporting a movable body comprising a shaft provided with an eccentric portion, a wheel rotatably disposed on the eccentric portion of the shaft, a split bushing disposed on the end of the shaft to provide a shoulder for the hub of the wheel, a bracket provided with an opening disposed to receive the bushing, and means associated with the bracket for clamping the bushing and the shaft in any desired position in the bracket.

2. In a structure of the character described, means for adjustably supporting a movable body comprising a shaft provided with an eccentric portion, a wheel rotatably disposed on the eccentric portion of the shaft, a pair of split bushings disposed on the shaft to act as shoulders for the hub of the wheel, a pair of brackets provided with openings disposed to receive the bushings, and clamping means associated with the brackets for clamping the bushings and the shaft in any desired position in the brackets whereby the wheel may be adjusted either laterally or vertically relative to the movable body.

3. In a structure of the character described, means for adjustably supporting a movable body comprising a shaft provided with an eccentric portion, a wheel rotatably disposed on the eccentric portion of the shaft, a pair of split bushings disposed on the shaft to support the shaft and act as shoulders for the hub of the wheel, a pair of brackets provided with forked portions having openings disposed to receive the bushings, and means for clamping the forked portions of the brackets around the bushings and the shaft whereby the wheel may be adjusted either laterally or vertically relative to the movable body.

In testimony whereof, I have hereunto subscribed my name this first day of February, 1927.

WALTER H. HIMES.